United States Patent
Shan et al.

(10) Patent No.: US 10,768,300 B2
(45) Date of Patent: Sep. 8, 2020

(54) DISTANCE DETECTION BY GLOBAL SHUTTER IMAGE SENSOR

(71) Applicant: Black Sesame Technologies Inc., San Jose, CA (US)

(72) Inventors: Jizhang Shan, Los Gatos, CA (US); Kuochin Chang, Cupertino, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 413 days.

(21) Appl. No.: 15/815,486

(22) Filed: Nov. 16, 2017

(65) Prior Publication Data

US 2019/0033450 A1      Jan. 31, 2019

(51) Int. Cl.
*G01S 17/10* (2020.01)
*G01S 17/89* (2020.01)
*G01S 7/4865* (2020.01)

(52) U.S. Cl.
CPC ............ *G01S 17/10* (2013.01); *G01S 7/4865* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 2006/0214121 A1* | 9/2006 | Schrey | G01S 17/894 250/559.38 |
| 2008/0144000 A1* | 6/2008 | Thun | G01S 17/894 356/5.05 |
| 2016/0103223 A1* | 4/2016 | Yarino | G01S 17/89 356/5.01 |
| 2017/0302861 A1* | 10/2017 | Shibata | H04N 5/355 |
| 2017/0307359 A1* | 10/2017 | Yates | G01S 17/14 |
| 2018/0045513 A1* | 2/2018 | Kitamura | H04N 5/353 |
| 2018/0053799 A1* | 2/2018 | Otani | H01L 31/101 |
| 2018/0259647 A1* | 9/2018 | Takano | G01S 7/4865 |
| 2019/0086520 A1* | 3/2019 | Boutaud | G01S 7/4865 |

* cited by examiner

*Primary Examiner* — Yuqing Xiao
*Assistant Examiner* — Amir J Askarian
(74) *Attorney, Agent, or Firm* — Timothy T. Wang; Ni, Wang & Massand, PLLC (57) ABSTRACT

A method of detecting a distance, comprising emitting an optical pulse, receiving at a first detector a reflected optical pulse, from a first exposure start time to a first exposure finish time, generating a first detector signal, receiving at an n-th detector the reflected optical pulse, from an n-th exposure start time to an n-th exposure finish time, generating an n-th detector signal, wherein the first exposure start time begins before the n-th exposure start time and the first exposure finish time ends before the n-th exposure finish time and the first exposure duration partially overlaps the n-th exposure duration and determining the distance of an object based on the first detector signal and the n-th detector signal.

2 Claims, 10 Drawing Sheets

DISTANCE DETECTION BY GLOBAL SHUTTER IMAGE SENSOR

BACKGROUND

The instant disclosure relates to method of measuring a distance using offset shutters on an image sensor.

Global shutter image sensors may be utilized to detect the motion of objects since the pixels in an image sensor can collect light simultaneously. This advantage can be used to detect very short pulses of infrared light reflected from an object in order to detect a distance between device and the object. The speed of light is such that in the automotive market a gated complementary metal oxide semiconductor (CMOS) sensor has only tens of picoseconds of exposure time to capture the reflected infrared (LR) light that may be used. This picosecond exposure time complicates the sensor designs and production and limits the sensitivity due to the short photon capture times.

Therefore, a more cost efficient and effective method of distance detection has been disclosed.

SUMMARY

In one embodiment a method of detecting a distance, comprising emitting an optical pulse, the optical pulse having a pulse beginning time and a pulse ending time, receiving at a first detector a reflected optical pulse, wherein the optical pulse is detected at the first detector from a first exposure start time to a first exposure finish time and has a first exposure duration, generating a first detector signal based on a first response of the first detector to the reflected optical pulse, receiving at an n-th detector the reflected optical pulse, wherein the optical pulse is detected at the n-th detector from an n-th exposure start time to an n-th exposure finish time and has an n-th exposure duration, generating an n-th detector signal based on an n-th response of the n-th detector to the reflected optical pulse, wherein the first exposure start time begins before the n-th exposure start time and the first exposure finish time ends before the n-th exposure finish time and the first exposure duration partially overlaps the n-th exposure duration and determining the distance of an object based on the first detector signal and the n-th detector signal.

In another embodiment a method of detecting a distance, comprising emitting an optical pulse, the optical pulse having a pulse beginning time and a pulse ending time, receiving at a first detector a reflected optical pulse, wherein the optical pulse is detected at the first detector from a first exposure start time to a first exposure finish time and has a first exposure duration, generating a first detector signal based on a first response of the first detector to the reflected optical pulse, receiving at an m-th detector the reflected optical pulse, wherein the optical pulse is detected at the m-th detector from an m-th exposure start time to an m-th exposure finish time and has an m-th exposure duration, generating an m-th detector signal based on an m-th response of the m-th detector to the reflected optical pulse, wherein the first exposure start time begins after the m-th exposure start time and the first exposure finish time ends before the m-th exposure finish time and the first exposure duration is within the m-th exposure duration and determining the distance of an object based on the first detector signal and the m-th detector signal.

In yet another embodiment a method of detecting a distance, comprising emitting an optical pulse, the optical pulse having a pulse beginning time and a pulse ending time, receiving at a first detector a reflected optical pulse, wherein the optical pulse is detected at the first detector from a first exposure start time to a first exposure finish time and has a first exposure duration, generating a first detector signal based on a first response of the first detector to the reflected optical pulse, receiving at an n-th detector the reflected optical pulse, wherein the optical pulse is detected at the n-th detector from an n-th exposure start time to an n-th exposure finish time and has an n-th exposure duration, generating an n-th detector signal based on an n-th response of the n-th detector to the reflected optical pulse, receiving at an m-th detector the reflected optical pulse, wherein the optical pulse is detected at the m-th detector from an m-th exposure start time to an m-th exposure finish time and has an m-th exposure duration, generating an m-th detector signal based on an m-th response of the m-th detector to the reflected optical pulse, wherein the n-th exposure start time begins after the first exposure start time and the m-th exposure start time begins before the first exposure start time and the n-th exposure finish time and the m-th exposure finish time ends after the first exposure finish time and the first exposure duration partially overlaps the n-th exposure duration and the first exposure duration is within the m-th exposure duration and determining the distance of an object based on the first detector signal, the n-th detector signal and the m-th detector signal.

DETAILED DESCRIPTION

It may be readily understood that the components of the present application, as generally described and illustrated in the figures herein, may be arranged and designed in a wide variety of different configurations. Thus, the following detailed description of the examples of a method as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be comprised in at least one example of the present application. Thus, appearances of the phrases example, examples, in some examples, in other examples, or other similar language, throughout this specification does not necessarily refer to the same group of examples, and the described features, structures, or characteristics may be combined in a suitable manner in one or more examples.

The reflection of an infrared beam by shuttered global image sensors may be used to calculate a distance from the sensors regardless of a pulse pattern. For example, an infrared (IR) light source may be placed at a first end and a global shutter image sensor placed at a second end. The speed of light is 299,792,458 m/s. The start of infrared light emission and the start exposure of the global shutter sensor may be aligned for simultaneous triggering. If the exposure duration of the global shutter sensor is 66.7 ns and the receiving pattern matches the emission pattern of the light source, then the infrared beam travels has traveled approximately 20 meters. The exposure duration is the difference between the time the shutter is gated open to the time the shutter is gated closed. It is also to be noted that the emitted light may be patterned to distinguish it from various other IR signals.

299,792,458÷10000,000×0.0667=19.996 meters

If both the light source and the image sensor are placed at the same end, the sensor receives the light pattern reflected by an object. Then the calculated distance between the sensor and object is approximately 10 meters.

19.996÷2=9.998 meters

If a car is assumed to be moving at a speed of 200 km/hr toward the detector which is equipped with a global shutter sensor triggering at 120 frames per second. When the detector collects one image frame of the infrared pattern, the car has moved 0.46 meters. Therefore, this device can emit and collect 21 samples before this car moves more than 10 meters from its original position. If both exposure time and light source pulse duration are kept at 66.7 ns, and the infrared light start emission is 1 us before the time when the sensor starts to collect light, when the image matches the light source pattern, the distance between that car and detector is:

299,792,458÷1,000,000÷2=149.896 meters

The distance is calculated from the time difference between when the light source is emitted and the matched pattern image is captured. If a faster frame rate is utilized, more samples may be collected to enhance the image pattern search. The shorter exposure time the sensor has, the higher the precision. In one example sensor design with 100 MHz system clock may be able to support 10 ns exposure times for ±3 meter precision.

Short exposure times limit the sensitivity of the sensor, as they decrease the signal to noise ratio (SNR) of images increases which may cause accuracy issues. The present disclosure depicts various configurations which may improve the accuracy without shortening the exposure time.

Figure 1:
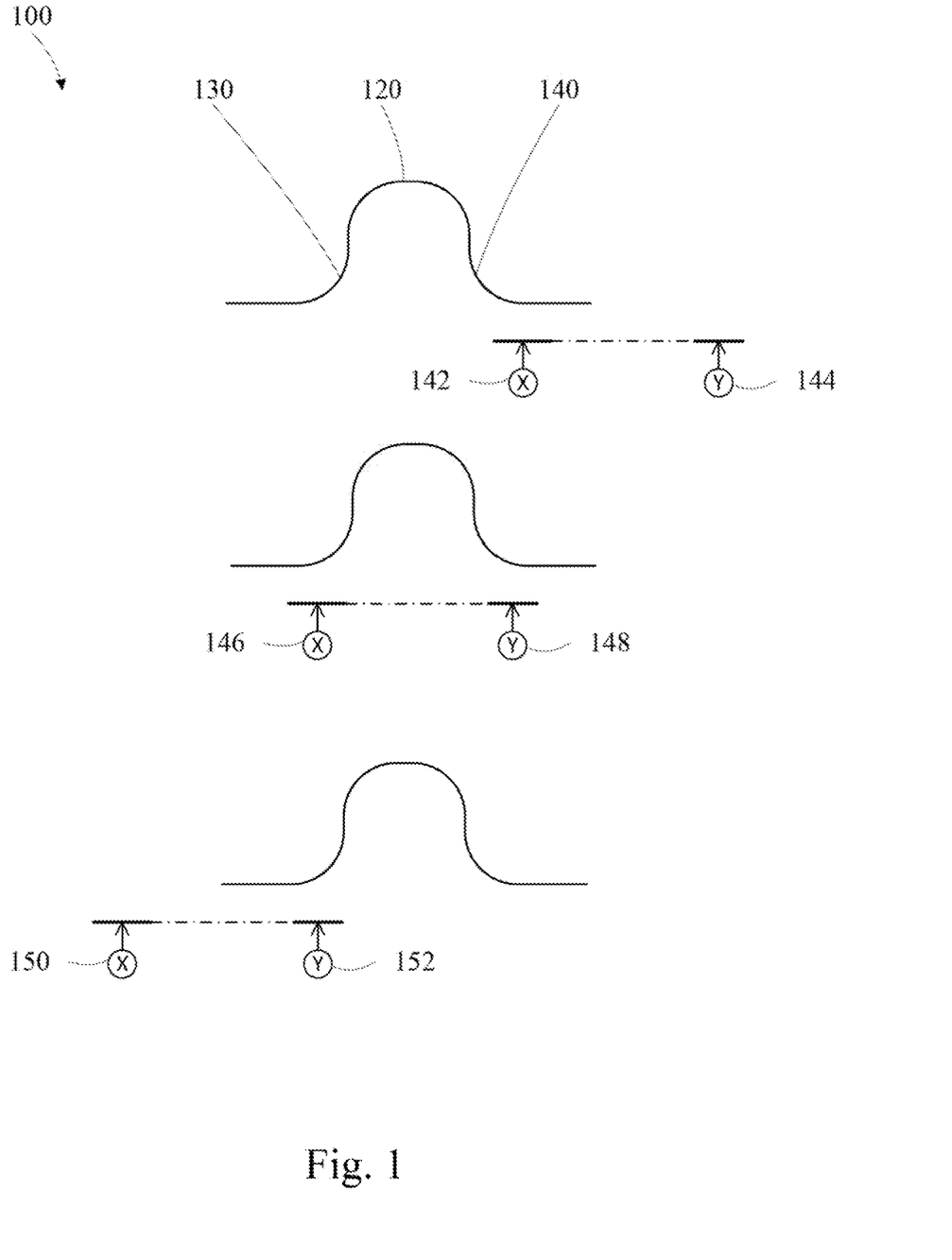
FIG. 1 is a depiction of an optical pulse reflection and single shutter samplings.

FIG. 1 depicts an optical pulse that has been reflected 120 from an object. The reflected optical pulse 120 has a rising edge 130 and a falling edge 140. An optical receiver has a shutter exposure starting at time X and finishing at time Y. In one instance the shutter exposure start 142 begins past the reflected optical pulse falling edge and exposure end 144 also ends after the reflected optical pulse falling edge. In another instance the shutter exposure start 146 begins before the pulse rising edge and exposure ends 148 after the pulse falling edge. In yet another instance the shutter exposure begins 150 before the pulse rising edge and exposure ends 152 at the onset of the pulse rising edge. The pulse itself may be patterned so that it may be correctly differentiated from stray optical pulses. Also, it is evident that the concurrence of the pulse and the shutter may not occur at all, or may be marginal.

Using multiple sensors whose exposure starting times may be variously triggered is suggested. The use of an external signal to spread out the sensors' exposure time in the time domain to collect multiple images from the multiple sensors may increase the pattern samples. Overlaying the exposure period among those sensors may enhance the precision.

In one example, two sensors are configured with the same frame rate and the same exposure time and the second sensor starts exposure half way after the first sensor exposure. If the match pattern is found on first sensor but not on second sensor, then the pulse was received in the first half of the first sensor exposure and the precision is improved by 4×. If both sensors catch the pattern, then the pulse has been intercepted at the overlap of the two exposures and the precision is again improved by 4×. The location of the reflected pulse is determined by calculating the pattern density difference between these two images.

Figure 2:
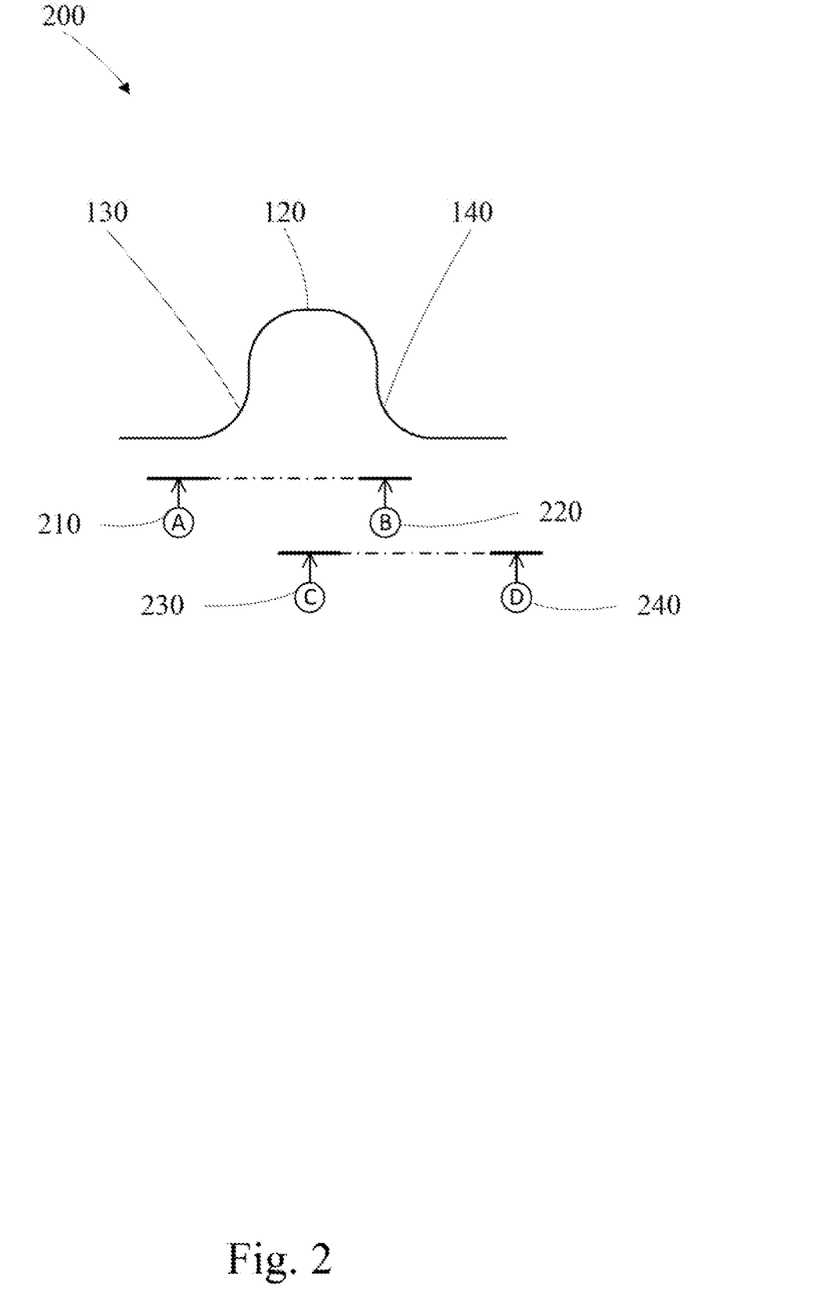
FIG. 2 is a depiction of an overlapping sequential sampling of a reflected optical pulse according to example embodiments.

FIG. 2 depicts the same optical pulse that has been reflected as in FIG. 1. In this example, N overlapping shutter exposures capture portions of the optical pulse 120. The first shutter exposure starts at time A 210 and finishes at time B 220. A portion of the optical pulse has been captured by this first sensor. The n-th shutter exposure starts at time C 230 and finishes at time D 240. Another portion of the optical pulse has been captured by this n-th sensor. If the intensity of the light is measured for both the first and n-th sensor, the center of the pulse may be determined from a time standpoint and an approximate distance determined. If the n-th shutter exposure duration is the same as the first shutter exposure duration and offset by ½ of the shutter exposure duration, then the precision of the measured distance may be increased by four times.

The more sensors that are incorporating by this method to further divide down the exposure overlay period, the further precision may be improved. Additionally, the exposure time may be different for the two sensors. For example, the first sensor may have a 30 ns exposure time and the second sensor may have a 60 ns exposure time and starts exposure 10 ns ahead and ends the exposure 20 ns after the first pulse. As long as the images are determined to occur during non-overlay exposure period, the precision may be improved by proper image processing of the density difference.

Figure 3:
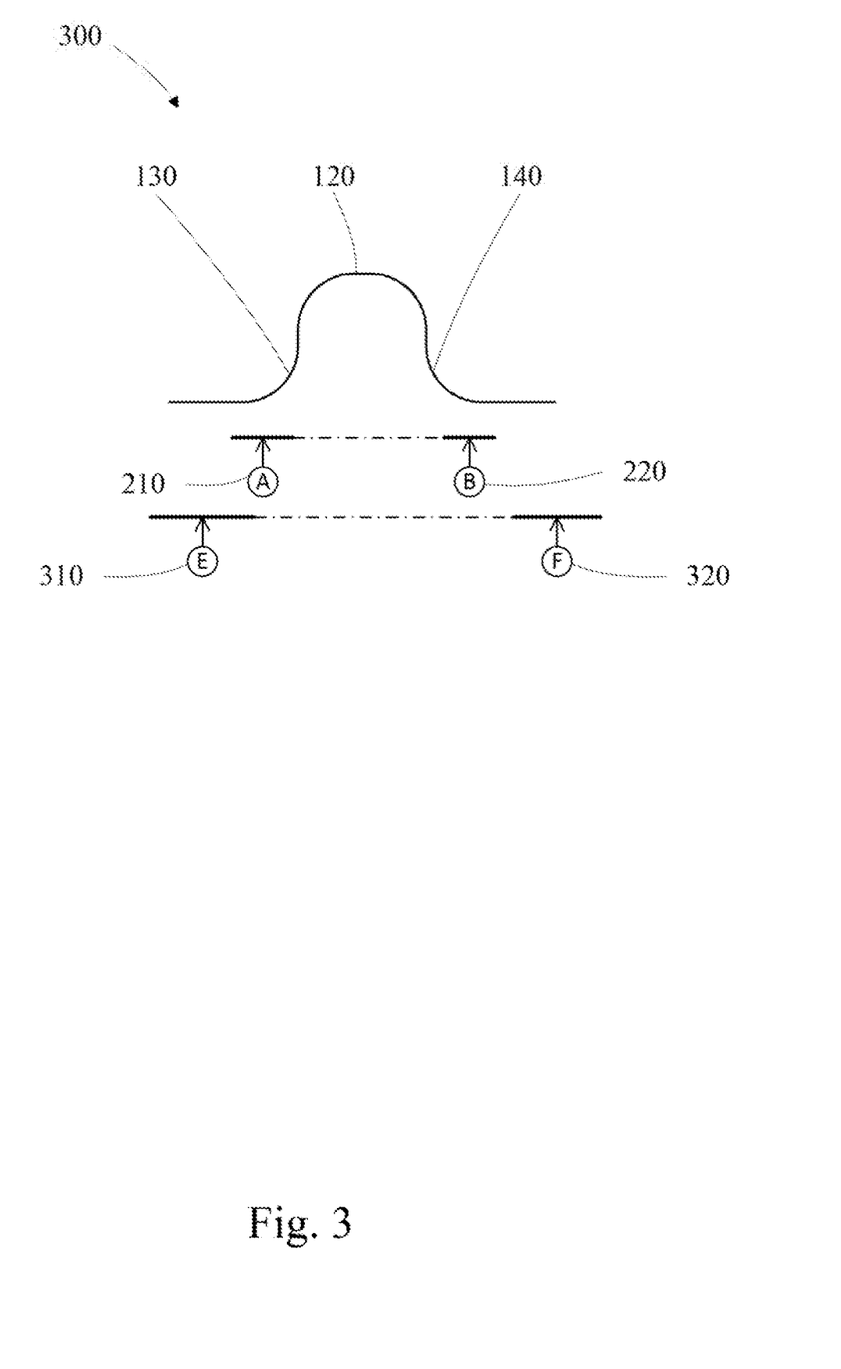
FIG. 3 is a depiction of an overlapping nested sampling of a reflected optical pulse according to example embodiments.

FIG. 3 depicts the same optical pulse that has been reflected as in FIG. 1. In this example, M nested shutter exposure captures portions of the optical pulse 120. The first shutter exposure begins at time A 210 and ends at time B 220. A portion of the optical pulse has been captured by this first sensor. The m-th shutter exposure begins at a time E 310 that precedes time A 210 and extends past the B 220 to time F 320. In this way the intensity of the first sensor and the m-th sensor may be utilized to determine a distance of the object.

Figure 4:
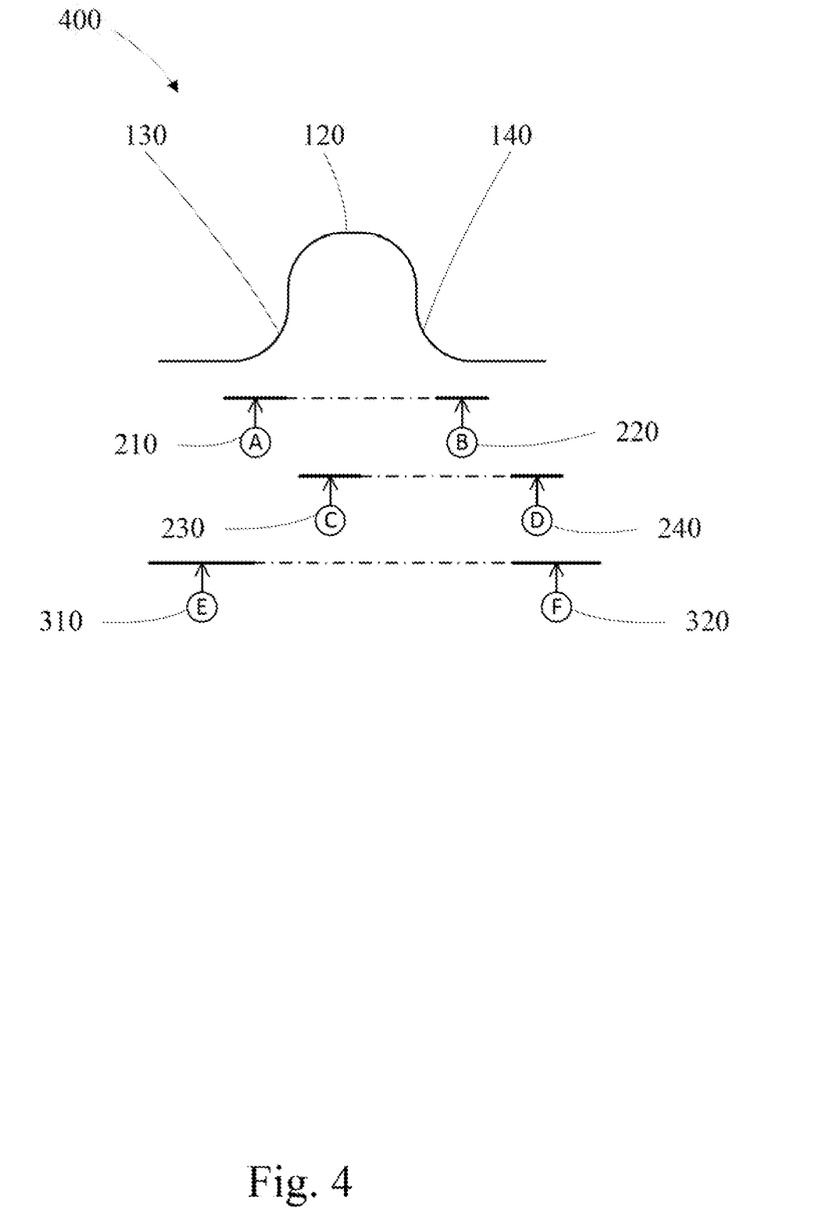
FIG. 4 is a depiction of an overlapping hybrid sampling of a reflected optical pulse according to example embodiments.

FIG. 4 depicts a hybrid approach, the same optical pulse that has been reflected as in FIG. 1 is referenced. The first shutter exposure begins at time A 210 and ends at time B 220. The optical pulse has been captured by this first sensor.

The n-th shutter exposure begins at time C 230 and ends at time D 240. Another portion of the optical pulse has been captured by this n-th sensor. The m-th shutter exposure begins at a time E 310 that precedes time A 210 and extends past the B 220 to time F 320. In this example, both the offset and nested exposure may be utilized to determine a distance of the object.

Figure 5:
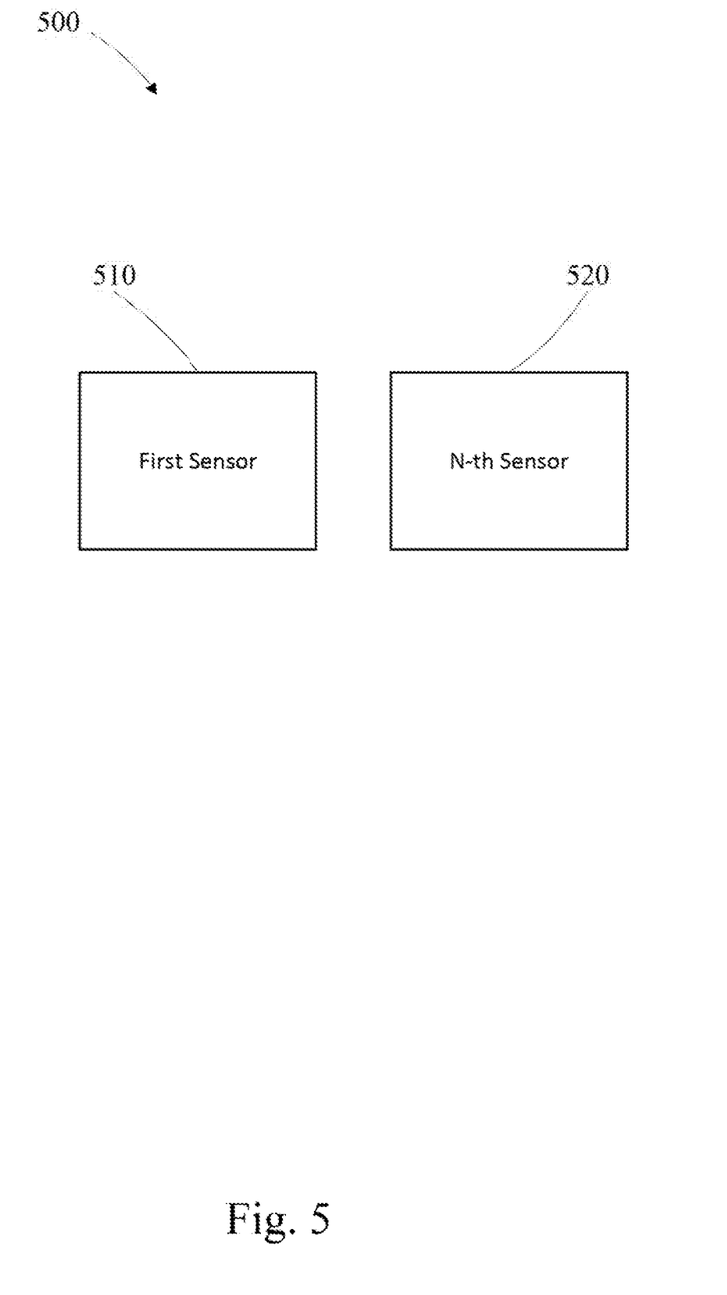
FIG. 5 is a depiction of a first and an n-th discrete sensor according to example embodiments.

FIG. 5 depicts a two sensor example, a first sensor 510 and an N-th sensor 520 are arranged in a planar configuration. This sensor configuration may also be utilized for the example shown in FIG. 2. The sensors may be coplanar to measure extended distances or in a non-coplanar orientation to distinguish near field objects.

Figure 6:
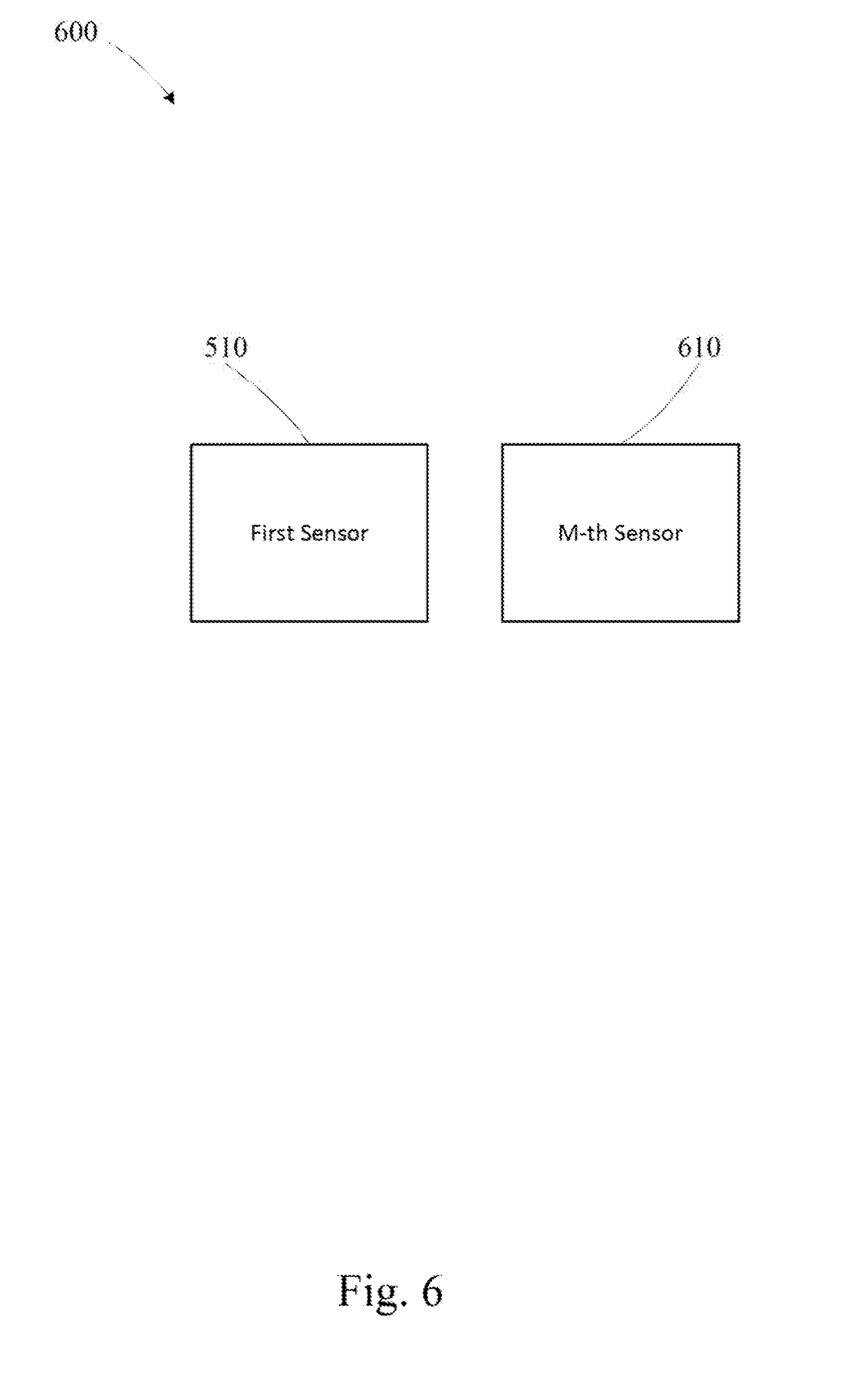
FIG. 6 is a depiction of a first and an m-th discrete sensor according to example embodiments.

FIG. 6 depicts another two sensor example, a first sensor 510 and an m-th sensor 610 are arranged in a planar configuration. This sensor configuration may also be utilized for the example shown in FIG. 3. The sensors may be coplanar to measure extended distances or in a non-coplanar orientation to distinguish near field objects.

Figure 7:
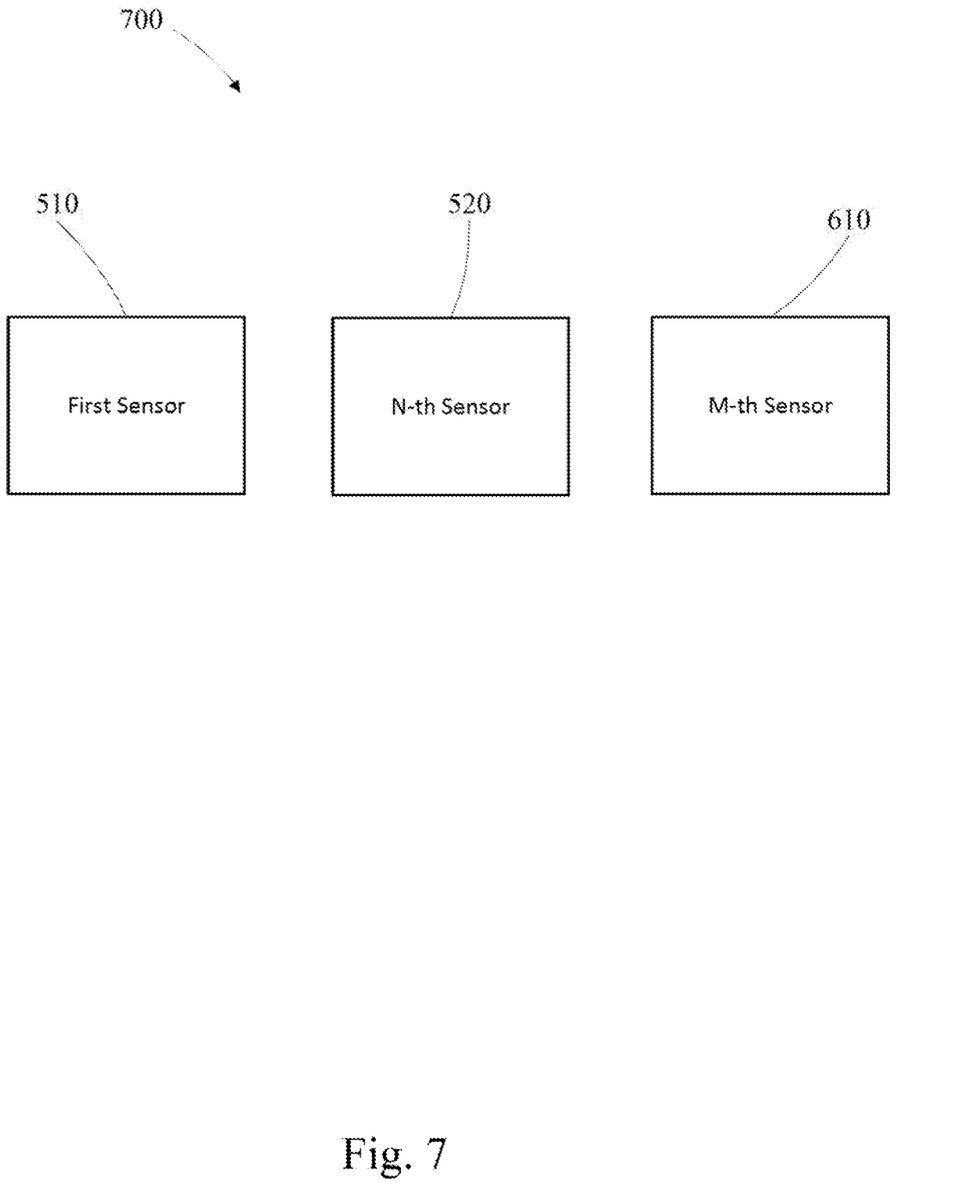
FIG. 7 is a depiction of a first, an n-th and an m-th discrete sensor according to example embodiments.

FIG. 7 depicts a three sensor example, a first sensor 510, an n-th sensor 520 and an m-th sensor 610 are arranged in a planar configuration. This sensor configuration may also be utilized for the example shown in FIG. 4. The sensors may be coplanar to measure extended distances or in a non-coplanar orientation to distinguish near field objects.

The multiple sensor configuration methods described may be used in single sensor if the sensor has multiple exposure control circuits, such as high dynamic range (HDR) sensors. HDR sensors may divide its array to several sub-arrays and each sub-array having exposure control circuits to spread out the overlay exposure period.

Figure 8:
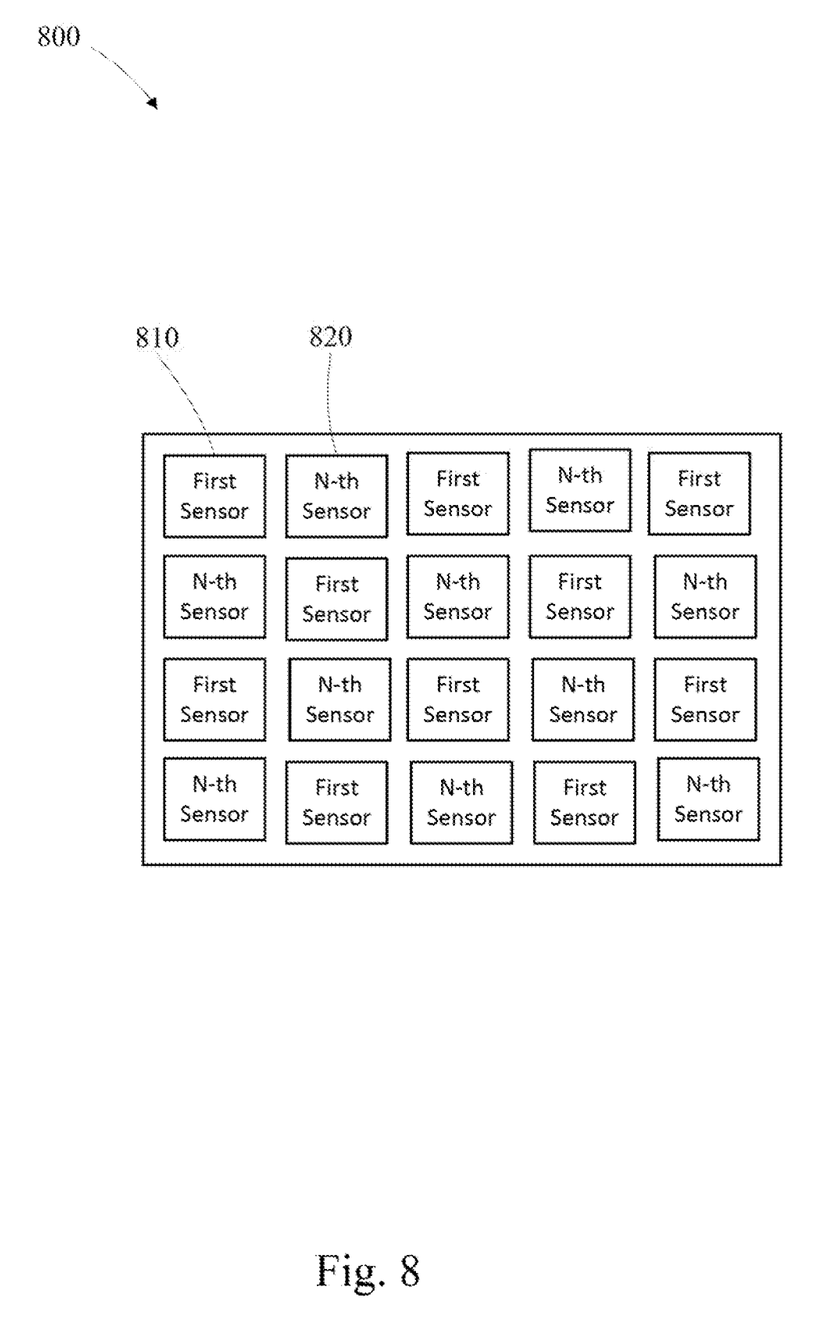
FIG. 8 is a depiction of a first and an n-th composite sensor according to example embodiments.

FIG. 8 depicts a first example of a single sensor with multiple sub arrays, the first sensor is 810 and offset in X and/or Y to the n-th sensors 820. This sensor configuration may also be utilized for the example shown in FIG. 2.

Figure 9:
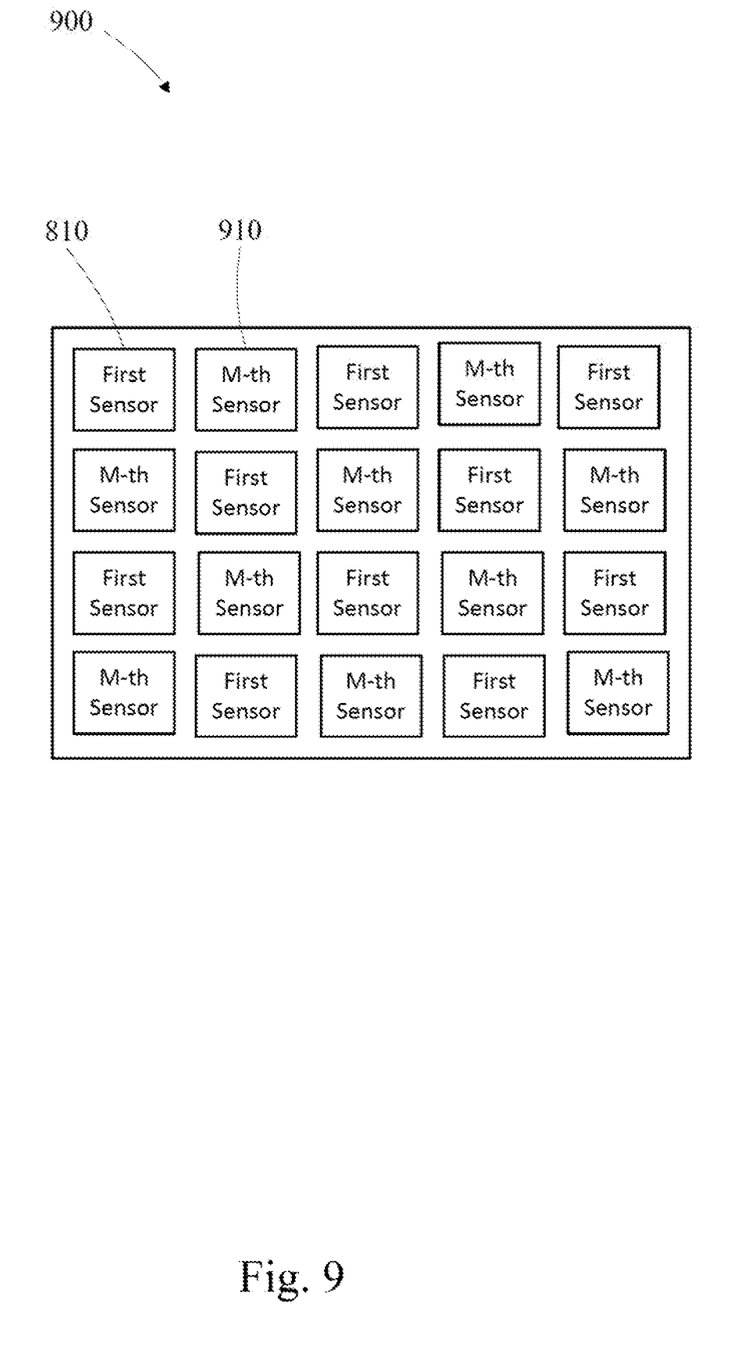
FIG. 9 is a depiction of a first and an m-th composite sensor according to example embodiments.

FIG. 9 depicts a second example of a single sensor with multiple sub arrays, the first sensor is 810 and offset in X and/or Y to the m-th sensors 910. This sensor configuration may also be utilized for the example shown in FIG. 3.

Figure 10:
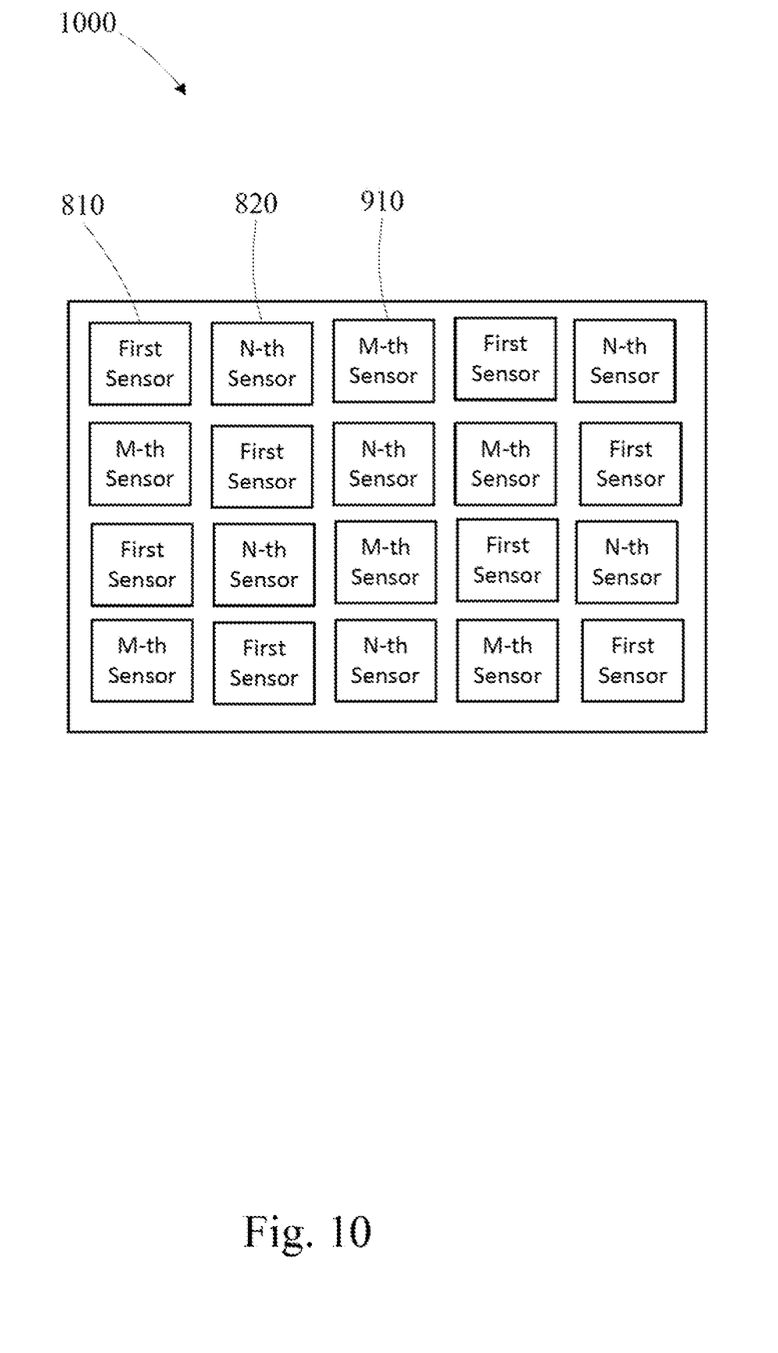
FIG. 10 is a depiction of a first, an n-th and an m-th composite sensor according to example embodiments.

FIG. 10 depicts a third example of a single sensor with multiple sub arrays, the first sensor is 810 and offset in X and/or Y to the n-th sensors 820 and m-th sensors 910. This sensor configuration may also be utilized for the example shown in FIG. 4.

View angle differences among those sensors may also be used to detect depth information to map a near field distance. A suitable application of this example is when the object is close to the detector and due to frame rate limitation, multiple pattern samples may not be able to be collected. In this situation, using a view angle difference may increase the accuracy of distance measurement.

There are several types of sensors on current market which have both visible light and IR light sensing capability pixels within one sensor, such as red, blue, green, infrared (RGBIR) sensor. Both visible light information and IR light information may be captured in the same image frame. This type of sensor may be used to calculate view angle differences in both visible light and IR light.

Therefore, using single or multiple global shutter sensors having both visible light and IR light sensing capabilities may be used to detect distance. Within the same captured images, the view angle differences in both visible and IR images may be used to calculate the distance of near field objects. These sensors' exposure time may be arranged to have an overlay period. The IR light travel time difference may be used to detect far field objects' distance and visible light information of far objects may be referenced in the IR image pattern search.

Although exemplary examples the method of the present disclosure have been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims.

The above examples are for illustrative purposes and are not intended to limit the scope of the disclosure or the adaptation of the features described herein to particular components. Those skilled in the art will also appreciate that various adaptations and modifications of the above-described preferred examples may be configured without departing from the scope and spirit of the disclosure. Therefore, it is to be understood that, within the scope of the appended claims, the disclosure may be practiced by examples in addition to those specifically described.

What is claimed is:

1. A method of detecting a distance, comprising:
    emitting an optical pulse, the optical pulse having a pulse beginning time and a pulse ending, time;
    receiving at a first detector a reflected optical pulse, wherein the optical pulse is detected at the first detector from a first exposure start time to a first exposure finish time and has a first exposure duration;
    generating a first detector signal based on a first response of the first detector to the reflected optical pulse;
    receiving an n-th detector the reflected optical pulse, wherein the optical pulse is detected at the n-th detector from an n-th exposure start time to an n-th exposure finish time and has an n-th exposure duration;
    generating an n-th detector signal based on an n-th response of the n-th detector to the reflected optical pulse;
    receiving at an m-th detector the reflected optical pulse, wherein the optical pulse is detected at the m-th detector from an m-th exposure start time to an m-th exposure finish time and has an m-th exposure duration;
    generating an m-th detector signal based on an n-th response of the n-th detector to the reflected optical pulse;
    wherein the n-th exposure start time begins after the first exposure start time and the m-th exposure start time begins before the first exposure start time and the n-th exposure finish time and the m-th exposure finish time end after the first exposure finish time and the first exposure duration partially overlaps the n-th exposure duration and the first exposure duration is within the m-th exposure duration; and
    determining the distance of an object based on the first detector signal, the n-th detector signal and the m-th detector signal.

2. The method of claim 1 wherein the determining of distance is based on intensity of the first detector signal, intensity of the n-th detector signal and intensity of the m-th detector signal.

* * * * *